Jan. 21, 1969     D. M. GALVIN ET AL     3,423,126
RETRACTABLE TRUCK BOX COVER
Filed April 17, 1967                    Sheet 1 of 2
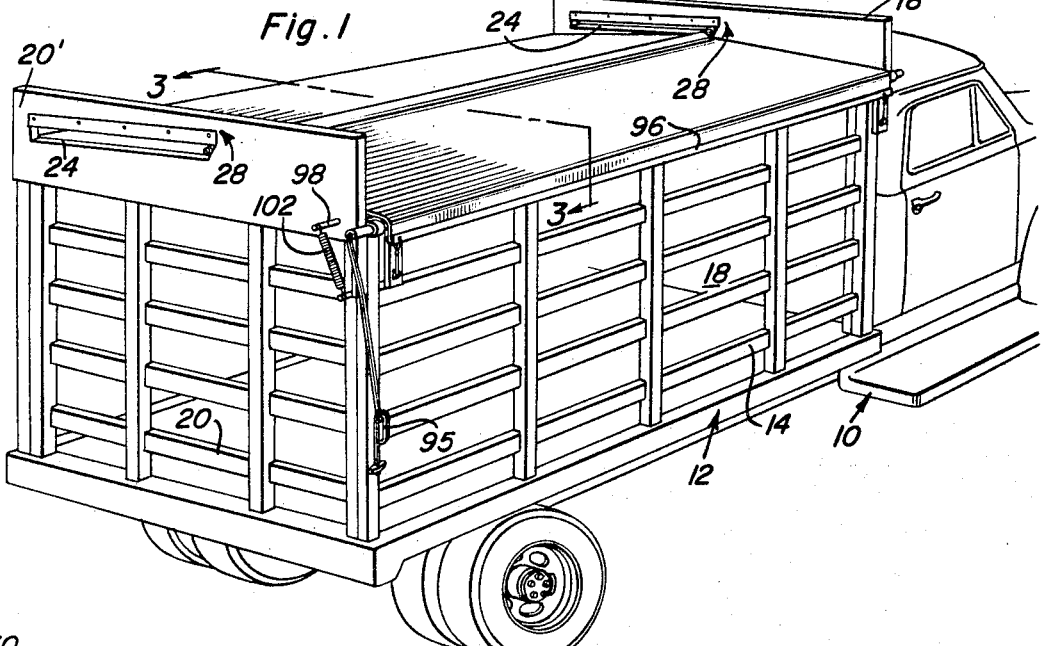
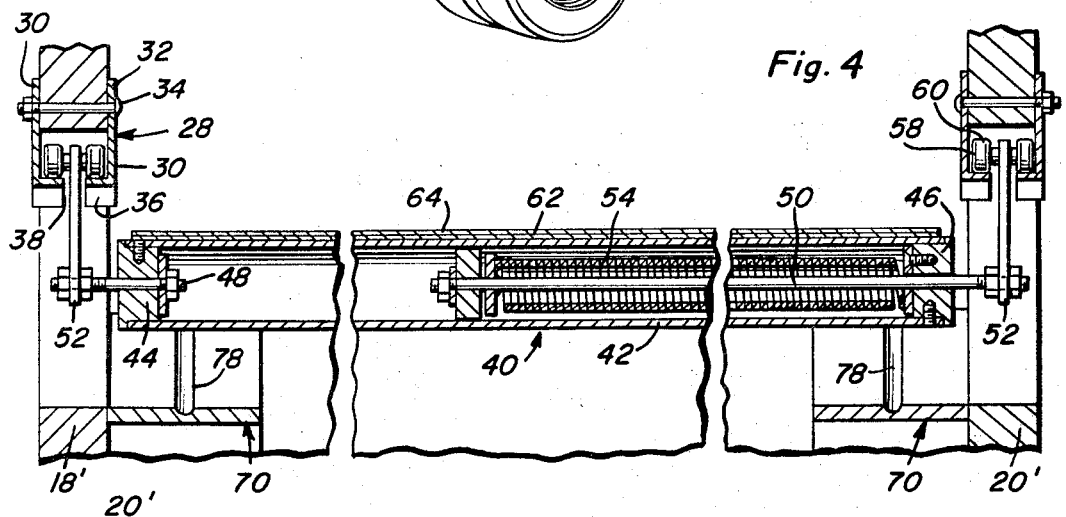
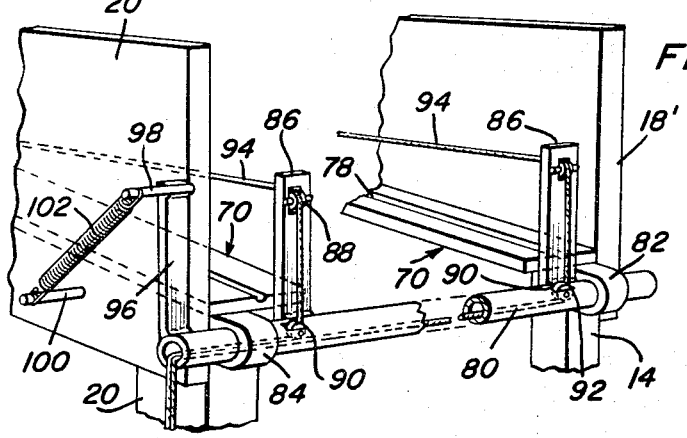
Daniel M. Galvin
Patrick J. Galvin
INVENTORS

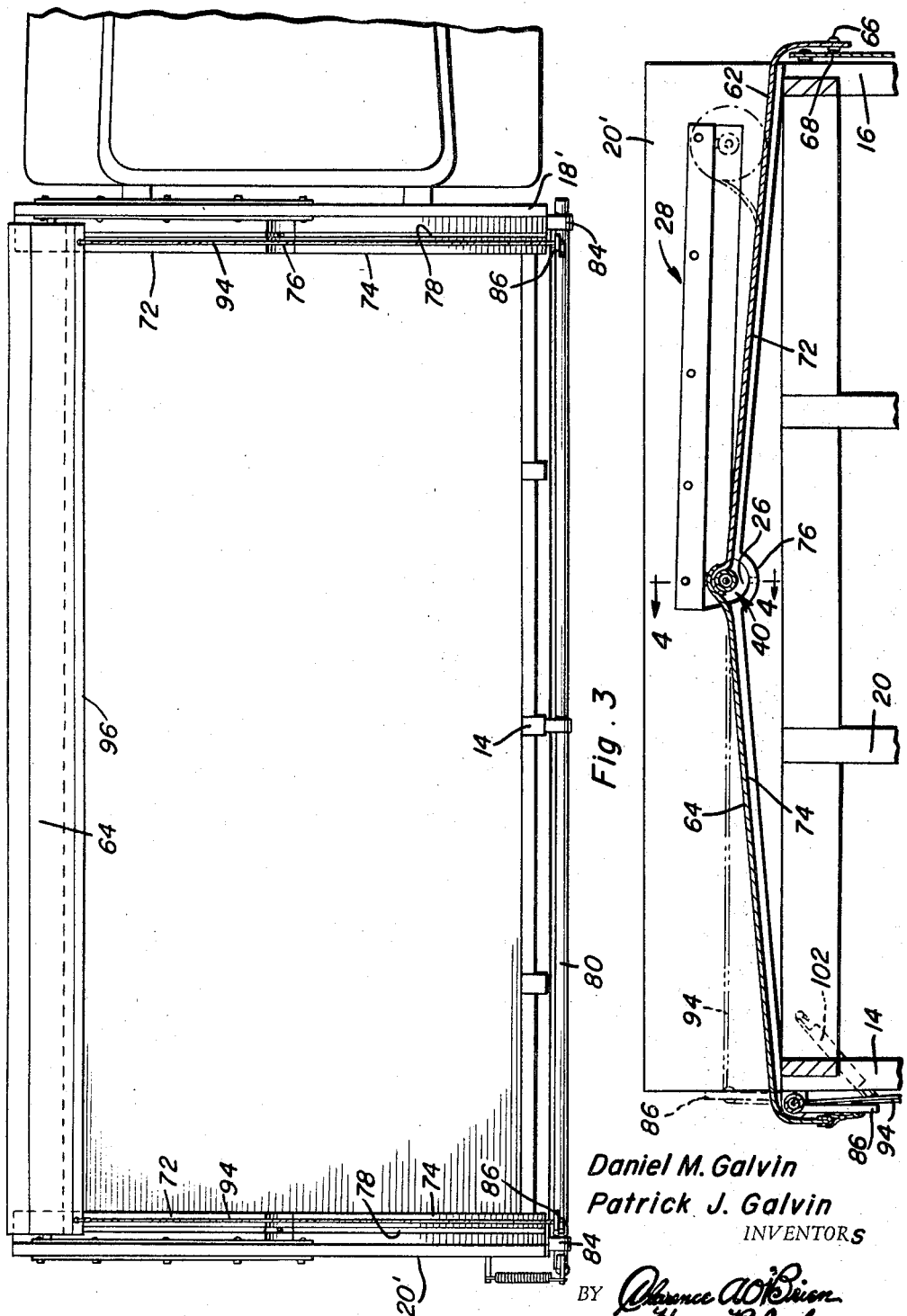

United States Patent Office 3,423,126
Patented Jan. 21, 1969

3,423,126
RETRACTABLE TRUCK BOX COVER
Daniel M. Galvin, 1109 8th St. NE., and Patrick J. Galvin, 1416 2nd St. SE., both of Minot, N. Dak. 58701
Filed Apr. 17, 1967, Ser. No. 631,262
U.S. Cl. 296—98                                    10 Claims
Int. Cl. B60j 7/02

ABSTRACT OF THE DISCLOSURE

A cover assembly including a roller having corresponding ends of a pair of elongated flexible cover panels secured thereto and concentrically wound thereon, the free end portion of one of the elongated panels being adapted for securement to one side portion of an area over which the cover assembly is to be erected and the free end portion of the other elongated panel being extendible toward the opposite side of the area to be covered by the cover assembly with means being provided for supporting the corresponding longitudinal edge portions of the panels and the adjacent ends of the roller when the cover assembly is extended over the area to be covered.

---

The cover assembly of the instant invention is specifically adapted to be utilized in conjunction with the load bed of a vehicle such as a truck. However, the cover assembly may be advantageously utilized in other environments.

The roller of the cover assembly is supported for general horizontal lateral shifting between opposite end walls of the associated load bed to be covered for movement between a fully retracted position immediately adjacent one side wall of the load bed and a fully extended position disposed centrally intermediate the opposite side walls of the associated load bed. Further, means is operatively connected between the roller and the associated load bed for yieldingly urging the roller to rotate in a direction winding the flexible panels of the cover assembly thereon. Of course, one free end portion of one of the panels is operatively connected to the adjacent side wall of the load bed and the free end of the other panel is extendible toward the other side wall of the associated load bed.

The main object of this invention is to provide a cover assembly for the load bed of a vehicle such as a truck and which will be readily extendible from and retractable toward an inoperative compact position adjacent one side of the associated load bed.

Another object of this invention is to provide a retractable cover assembly in accordance with the immediately preceding object and which requires a minimum amount of hardware and other components for supporting the cover assembly in its extended position and shifting the cover assembly from its retracted position toward its extended position.

Still another object of this invention is to provide a retractable cover assembly including structural components thereof adapting the cover assembly for use in conjunction with substantially all types of load beds bound on opposite sides by means of suitable structural members extending therealong.

A final object of this invention to be specifically enumerated herein is to provide a retractable cover assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a perspective view of a truck whose load bed has the cover assembly of the instant invention operatively associated therewith and with the cover assembly in a fully extended operative position;

FIGURE 2 is an enlarged fragmentary top plan view of the truck illustrated in FIGURE 1 and with the cover assembly in a fully retracted position;

FIGURE 3 is an enlarged fragmentary transverse vertical sectional view taken substantially upon the plane indicated by the section line 3—3 of FIGURE 1;

FIGURE 4 is an enlarged fragmentary vertical sectional view taken susbtantially upon the plane indicated by the section line 4—4 of FIGURE 3; and FIGURE 5 is a fragmentary perspective view of the cover extending mechanism which may be utilized to extend the cover assembly from its retracted position and to secure the cover assembly in its fully extended position.

Referring now more specifically to the drawings the numeral 10 generally designates a truck including a load bed referred to in general by the reference numeral 12 and including upstanding opposite side walls 14 and 16, a front wall 18, and a rear wall 20.

The front and rear walls 18 and 20 include upwardly projecting panel-like extensions 18' and 20' having generally parallel and slightly inwardly and upwardly inclined slots 24 formed therethrough. The slots 24 each extend inwardly from one side of the corresponding extension toward and slightly past the center of the corresponding extension. Each slot 24 includes a vertically enlarged inner end portion 26 and a pair of similar channel members generally referred to by the reference numerals 28 are provided and secured to the portions of the extensions 18 and 20 defining the upper surfaces of the slots 24.

Each of the channel members is constructed of a pair of oppositely facing L-shaped angle members 30 including vertical flange portions 32 secured to opposite sides of the corresponding extension by means of suitable fasteners 34 and horizontal inwardly directed flange portions 36 whose free edge portions are spaced apart to define a vertically extending slot 38 therebetween.

A roller assembly generally referred to by the reference numeral 40 is provided and includes a roller sleeve 42 in which a pair of opposite end plugs 44 and 46 are secured. The end plugs 44 rotatably receive therethrough a pair of stub axle forming shafts 48 and 50 and the remote ends of the shafts 48 and 50 are secured to the lower end portions of a pair of similar upstandng suspension arms 52 against rotation relative thereto. Further, a torsion spring 54 is secured between the shaft 50 and the end plug 46 and is disposed within the tubular roller body or sleeve 42. The spring 54 yieldingly urges the roller sleeve 42 toward rotation relative to the shafts 48 and 50 in a clockwise direction as the roller assembly 40 is viewed in FIGURE 3 of the drawings and the upper ends of the arms 52 project through the corresponding slots 38 and have wheeled follower truck asemblies 58 supported therefrom including wheels 60 rollingly engaged with the upper surface portions of the horizontal flanges 36.

The roller asembly 40 includes a pair of elongated flexible panels 62 and 64 including corresponding end portions secured to the roller sleeve 42 for rotation therewith and for coaxial winding on the roller sleeve 42. The free end of the panel 62 includes releasable fastener means 66 releasably engageable with suitable coacting anchor means 68 carried by the side wall 16 and when the roller sleeve 42 is allowed to rotate in a clockwise direction as viewed in FIGURE 3 of the drawings the roller sleeve 42 is wound up on the panel 62 while the panel 64 is simultaneously wound on the roller sleeve 42.

Thus, it may be seen that when the roller assembly 40 is positioned as illustrated in phantom lines in FIGURE 3 of the drawings the free end of the panel 64 may be pulled toward the side wall 14 so as to simultaneously unroll the panel 64 from the roller sleeve 42, shift the roller assembly 40 from the phantom line position illustrated in FIGURE 3 of the drawings to the solid line position illustrated in FIGURE 3 of the drawings and to unroll the roller sleeve 42 from the anchoring panel 62 thus extending the panels 62 and 64 over the load bed 12.

In addition, each of the extensions 18′ and 20′ includes an inwardly directed supporting ledge structure generally referred to by the reference numeral 70 and including oppositely upwardly and inwardly inclined opposite end portions 72 and 74 joined at their adjacent ends by means of an upwardly opening and generally semi-cylindrical portion 76. The supporting ledge structures 70 are of course provided to support the corersponding longitudinal edge portions of the panels 62 and 64. The opposite end portions of the supporting ledge structures are each provided with upwardly opening longitudinal drain grooves 78 and the semi-cylindrical portions 76 of the supporting ledge structures enable the corresponding ends of the roller sleeve 42 to drop slightly as the roller sleeve 42 moves to its fully extended position illustrated in FIGURE 3 of the drawings. In this manner, the end portions of the panels 62 and 64 immediately adjacent the roller sleeve 42 are maintained in surface-to-surface contact with the upper surface portions of the corresponding supporting ledge structures 70 along their marginal edge portions.

With attention now invited more specifically to FIGURES 1 and 5 of the drawings there may be seen a tubular operating sleeve 80 rotatably journaled at its opposite ends from the side wall 14 by means of suitable journal brackets 82 and 84. The sleeve 80 includes a pair of generally parallel laterally directed arms 86 and the free ends of the arms 86 are suitably apertured and provided with journaled pulley wheels 88. In addition, the sleeve 80 is apertured as at 90 adjacent the ends of the arms 86 secured to the sleeve 80 and provided with a pair of journaled pulley wheels 92 adjacent the apertures 90.

A pair of elongated tension members 94 have one pair of corresponding ends theerof secured to opposite end portions of a bracing rod 96 secured to and extending along the free edge portion of the panel 64 and the tension members 94 are trained through the apertured ends of the arms 86, over the pulley wheels 88, down through the apertures 90 and under the pulley wheels 92 before passing outwardly of the rear end of the sleeve 80. The free ends of the tension members 94 projecting out of the rear end of the sleeve 80 may be suitably secured to any portion of the side wall 14 as at 95. In addition, the sleeve 80 includes a third laterally projecting arm 96 carried by its rear end portion and which generally parallels the arms 86. The free end of the arm 96 is provided with a rearwardly projecting anchor pin 98 and the extension 20′ is provided with a similar anchor pin 100.

An expansion spring 102 is secured between the anchor pins 98 and 100 and may therefore be utilized to yieldingly urge the sleeve 80 toward a first over-center position with the arms 86 projecting upwardly and their base ends abutting the adjacent ends of the corresponding supporting ledge structures 70 as well as a second over-center position such as that illustrated in FIGURE 3 of the drawings drawing the free end portion of the panel 64 over the sleeve 80 and thus maintaining the panels 64 and 72 in a taut fully unrolled position relative to the sleeve 42. If it is desired, suitable abutments may be provided for engagement by the arms 86 to limit movement of the latter toward the limit positions thereof illustrated in FIGURE 3 of the drawings but if such abutments are not provided the over-center position of the arms 86 illustrated in FIGURE 3 of the drawings is defined by the fully extended and taut condition of the panels 62 and 64.

Of course, when the free ends of the tension members 94 are released from engagement with the side wall 14 and the sleeve 80 is swung from the position thereof illustrated in FIGURE 3 of the drawings to the position thereof illustrated in FIGURE 5 of the drawings the spring 54 is sufficiently strong to cause clockwise rotation of the roller sleeve 42 up out of the upwardly opening semi-cylindrical portions 76 along the panel 72 toward the fully retracted position of the roller assembly and panels 62 and 64 illustrated in phantom lines in FIGURE 3 of the drawings.

Further, the channel members 28 may of course be secured to the inner surfaces of the front and rear walls of a load bed so as to preclude the necessity of having to form slots through such front and rear walls such as slots 24 and if the distance between the front and rear walls of an associated load bed between which the roller assembly 40 spans is reasonably great, the load bed may be provided with a supporting ledge strucutre (not shown) similar to the supporting ledge structures 70 and spaced centrally intermediate the latter so as to support the center portion of the roller assembly 40 and the panels 62 and 64.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a load receiving receptacle including opposing upstanding walls, a cover for said receptacle including a roller having its opposite ends supported from said receptacle for movement between a retracted position extending between upper end portions of one pair of corresponding upstanding marginal edge portions of said opposing walls and an extended position extending between corresponding upper portions of said opposing walls spaced centrally intermediate their opposite upstanding edge portions, a pair of flexible cover panels having corresponding end portions concentrically wound on said roller, the free end portion of one of said panels being anchored to said receptacle along a portion thereof extending between said upper end portions of said one pair of coresponding upstanding marginal edge portions and the free end portion of the other of said panels being adapted to be drawn toward a position extending between the upper end portions of the other pair of corresponding upstanding marginal edge portions of said opposing walls.

2. The combination of claim 1 wherein said receptacle includes a second pair of opposing upstanding walls extending between corresponding upstanding marginal edge portions of the first mentioned walls, the free end portion of said one panel being anchored to a first wall of the second mentioned pair of opposing walls.

3. The combination of claim 2 wherein said receptacle and the free end portion of the other of said panels include coacting means operative to releasably anchor the last mentioned free end portion in a condition unrolled from said roller and adjacent the second wall of the second mentioned pair of opposing walls.

4. The combination of claim 3 wherein said coacting means includes a pair of elongated flexible tension members having corresponding end portions secured to opposite end portions of the free end edge portion of said other panel and means carried by said receptacle to which said tension members may be anchored.

5. The combination of claim 1 including support means carried by said receptacle and defining supporting surfaces projecting inwardly of and beneath the corresponding longitudinal edge portions of said panels for support of the same when said roller and panels are in their extended positions.

6. The combination of claim 5 wherein said supporting surfaces are defined by the upper surface portions of inwardly projecting flange means carried by said opposing walls and extending between the opposite upstanding edge portions thereof.

7. The combination of claim 6 wherein said flange means also include portions thereof operable to support the opposite end portions of said roller when the latter is in its extended position.

8. The combination of claim 7 wherein corresponding end portions of said flange means further are operable to support the corresponding ends of said roller when the latter is in its extended position.

9. The combination of claim 1 including an elongated member journaled from said receptacle for rotation about its longitudinal axis and disposed in a position extending generally between the upper portions of the other pair of corresponding upstanding edge portions of said opposing walls, said elongated member including a pair of generally parallel elongated and laterally outwardly projecting arms, means operatively connecting the free end portions of said arms to said free end portion of the other of said panels and operable to draw said other of said panels toward said arms, said elongated member being rotatable at least 90 degrees from a position with said arms generally vertically disposed.

10. The combination of claim 9 wherein the last mentioned means include a pair of elongated flexible tension members having one pair of corresponding ends secured to said free end of said other panel and slidably engaged with the free end portions of said arms.

References Cited

UNITED STATES PATENTS 1,786,048 12/1930 Williams _____ 296—98
2,976,082 3/1961 Dahlman _____ 296—98

LEO FRIAGLIA, *Primary Examiner.*

JOEL E. SIEGEL, *Assistant Examiner.*